United States Patent [19]

Shimizu

[11] Patent Number: 5,142,877
[45] Date of Patent: Sep. 1, 1992

[54] MULTIPLE TYPE AIR CONDITIONING SYSTEM WHICH DISTRIBUTES APPROPRIATE AMOUNT OF REFRIGERANT TO A PLURALITY OF AIR CONDITIONING UNITS

[75] Inventor: Keiichirou Shimizu, Shizuoka, Japan

[73] Assignee: Kabushiki Kaisha Toshiba, Kanagawa, Japan

[21] Appl. No.: 672,910

[22] Filed: Mar. 21, 1991

[30] Foreign Application Priority Data

Mar. 30, 1990 [JP] Japan .................................. 2-084665

[51] Int. Cl.$^5$ ........................................... G01K 13/00
[52] U.S. Cl. ........................................ 62/129; 62/175; 62/228.4; 62/223; 62/224; 62/229; 62/204; 62/200; 165/22
[58] Field of Search ................ 62/175, 160, 199, 200, 62/228.4, 228.5, 222, 224, 223, 225, 126, 129, 229, 204; 165/22

[56] References Cited

U.S. PATENT DOCUMENTS

| | | | |
|---|---|---|---|
| 4,344,293 | 8/1982 | Fujiwara et al. | 62/129 X |
| 4,480,442 | 11/1984 | Ide et al. | |
| 4,653,288 | 3/1987 | Sayo et al. | 62/225 |
| 4,720,982 | 1/1988 | Shimiza et al. | 62/204 |
| 4,732,318 | 3/1988 | Osheroff . | |
| 4,754,919 | 7/1988 | Otsuka et al. | |
| 4,878,357 | 11/1989 | Sekigami et al. | 52/228.4 X |
| 4,926,653 | 5/1990 | Masuda et al. | 62/228.4 X |
| 4,932,220 | 6/1990 | Inoue . | |
| 5,035,119 | 7/1991 | Alsonz | 62/225 |

FOREIGN PATENT DOCUMENTS

| | | |
|---|---|---|
| 0075841 | 3/1990 | Japan . |
| 2038036 | 7/1980 | United Kingdom . |
| 2183018 | 5/1987 | United Kingdom . |
| 2194651 | 3/1988 | United Kingdom . |
| 2235550 | 3/1991 | United Kingdom . |

Primary Examiner—Albert J. Makay
Assistant Examiner—J. Sollecito
Attorney, Agent, or Firm—Philip M. Shaw, Jr.

[57] ABSTRACT

Refrigerant flowing through each air conditioning unit of a multiple air conditioning system is respectively detected by a refrigerant flow sensor provided in each air conditioning unit and the degree of opening of a refrigerant flow control valve arranged in each air conditioning unit is controlled in response to the detection result of the corresponding refrigerant flow sensor to supply an appropriate amount of refrigerant to each air conditioning unit. The capacity of the compressor of a refrigerant supply unit of the multiple air conditioning system is controlled based on the detection result of each refrigerant flow sensor and the actual opening degree of each refrigerant flow control valve.

10 Claims, 12 Drawing Sheets

MULTIPLE TYPE AIR CONDITIONING SYSTEM WHICH DISTRIBUTES APPROPRIATE AMOUNT OF REFRIGERANT TO A PLURALITY OF AIR CONDITIONING UNITS

BACKGROUND OF THE INVENTION

1. Field of the Invention

The present invention relates, in general, to air conditioning systems. In particular, the invention relates to a multiple type air conditioning system including a plurality of internal units (air conditioning units) and one external unit (refrigerant supply unit) which respectively supplies refrigerant to the plurality of internal units.

2. Description of the Related Art

A conventional multiple type air conditioning system typically includes one external unit and a plurality of internal units to supply conditioned air to different spaces to be air-conditioned. In this type of the air conditioning system, increase in the internal unit has been desired to meet with increase in the space to be air-conditioned. In addition, an internal unit which has a small air conditioning capacity is also increased as a personal air conditioning. In this circumstances, the air conditioning capacity of the internal unit is subdivided, and connecting pipes having a different diameter are employed to supply sufficient amount of refrigerant to each subdivided internal unit. Junction point of the connecting pipes is also increased.

In the above-described conventional multiple air conditioning system, since the refrigerant flow to each internal unit is greatly varied because of the different flow resistance in each connecting pipe, an appropriate distribution of refrigerant to each internal unit may not be achieved. Such an undistribution of refrigerant adversely affects the air conditioning operation of each internal unit if the air conditioning capacity of each internal unit is small. The air conditioning capacity of the internal unit having a small air conditioning capacity is greatly changed and a stable air conditioning may not be obtained.

SUMMARY OF THE INVENTION

Accordingly, it is an object of the present invention to enable each internal unit of a multiple type air conditioning system to carry out a stable air conditioning to the corresponding spaces.

It is another object of the invention to distribute an appropriate amount of refrigerant to each internal unit of a multiple type air conditioning system.

To accomplish the above-described objects, a multiple air conditioning system includes a plurality of air conditioning units for respectively supplying conditioned air to spaces, a variable refrigerant supply unit for supplying refrigerant to the plurality of air conditioning units on the basis of the sum total of a required air conditioning capacity of each air conditioning unit, determining section for respectively determining a target amount of refrigerant flowing into each air conditioning unit based on the corresponding required air conditioning capacity, refrigerant flow sensor section for respectively detecting an actual amount of refrigerant flowing through each air conditioning unit, refrigerant flow control section for respectively controlling the amount of refrigerant flowing through each air conditioning unit, and control section responsive to the refrigerant flow sensor section for regulating the refrigerating flow control section so that the respective actual amounts of refrigerant detected by the refrigerant flow sensor section reach the corresponding target amounts of refrigerant.

BRIEF DESCRIPTION OF THE DRAWINGS

The present invention will be better understood by reference to the accompanying drawings, wherein same reference numerals throughout the various Figures denote like structural elements and wherein.

DETAIL DESCRIPTION OF THE PREFERRED EMBODIMENTS

Figure 1:
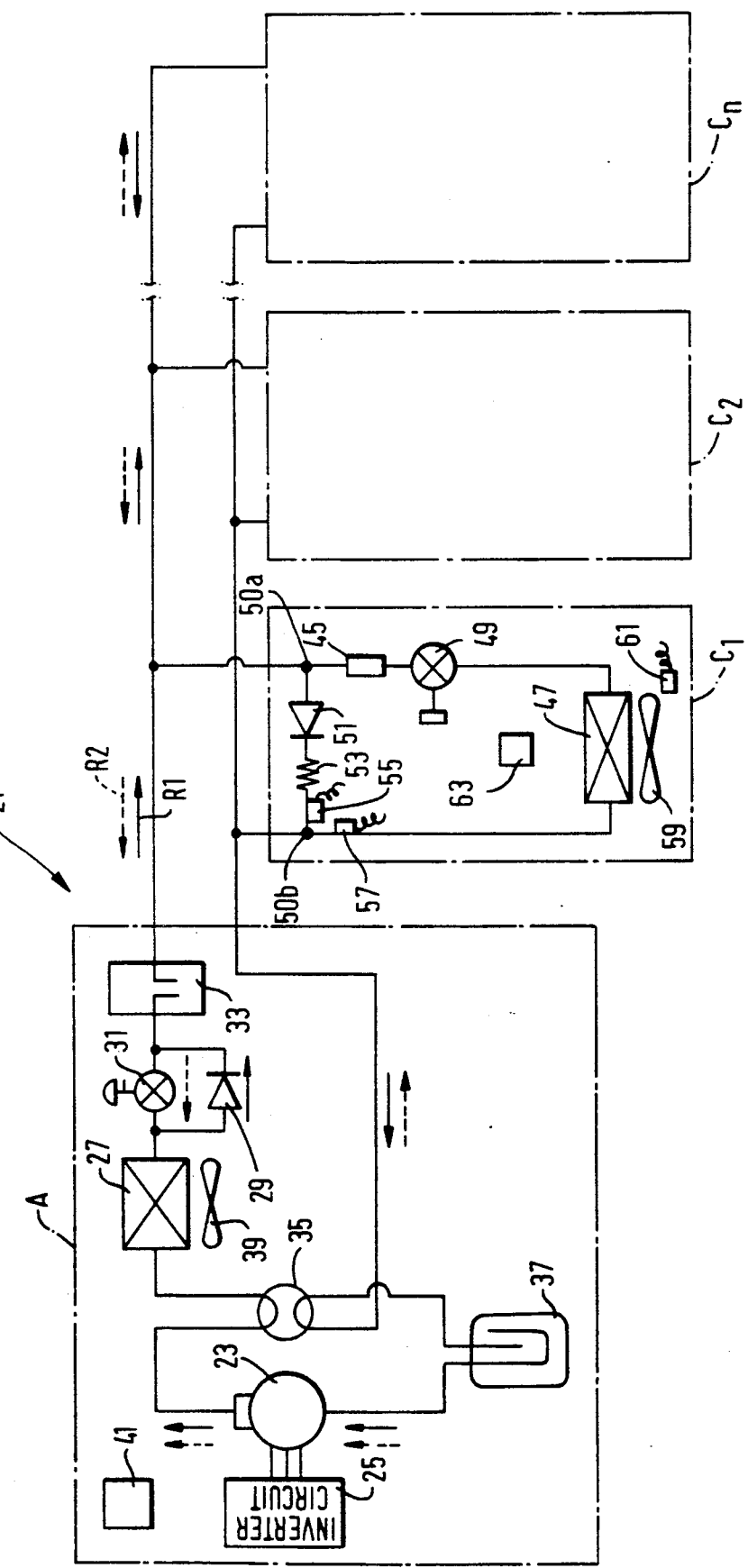
FIG. 1 is a refrigerating circuit diagram illustrating a multiple type air conditioning system of a first embodiment of the present invention.

Preferred embodiments of the present invention will be now described in more detail with reference to the accompanying drawings. However, in the drawings, the same numerals are applied to the similar elements in the drawings, and therefore the detailed descriptions thereof are not repeated.

In FIG. 1, a multiple air conditioning system 21 includes an external unit A (refrigerant supply unit) and a plurality of internal units C1, C2, . . . and Cn (air conditioning unit) connected to external unit A to constitute a multiple refrigerating circuit. External unit A includes a variable capacity compressor 23 controlled by an inverter circuit 25. The output side of compressor 23 is connected to an external heat exchanger 27, a parallel circuit of a check valve 29 and an expansion valve 31, and a liquid tank 33 through a four-way valve 35. An accumulator 37 is connected between four-way valve 35 and the input side of compressor 23. An external fan 39 is arranged close to external heat exchanger 27. External unit A also includes an external unit controller 41 to control various operations of external unit A.

Each internal unit C1, C2, ... or Cn has a refrigerating circuit similar to one another. Thus, the construction of one of the internal units C1 will be described. Internal unit C1 includes a refrigerant flow sensor 45 connected to liquid tank 33 of external unit A. Refrigerant flow sensor 45 is connected to an internal heat exchanger 47 through a refrigerant flow rate control valve 49. Internal heat exchanger 47 is connected to the input side of compressor 23 through four-way value 35 and accumulator 37. Refrigerant flow sensor 45 detects the amount of refrigerant flowing into internal unit C1. Refrigerant flow rate control valve 49 controls the amount of refrigerant flowing through internal unit C1. In this case, refrigerant flow control valve 49 acts as an expansion valve in the cooling operation. The input side of a check valve 51 is connected to a point 50a between liquid tank 33 and refrigerant flow sensor 45 and the output side thereof is connected to a point 50b between internal heat exchanger 47 and four-way valve 35 through a capillary tube 53. A first refrigerant temperature sensor 55 is arranged on the pipe between the output side capillary tube 53 and the point 50b. A second refrigerant temperature sensor 57 is mounted on the pipe between internal heat exchanger 47 and the point 50b. An internal fan 59 is arranged close to internal heat exchanger 47. An air temperature sensor 61 is also arranged close to internal heat exchanger 47 to detect the temperature of air flowing into internal heat exchanger 47. Internal unit C1 is provided with an internal unit controller 63 to control various operations thereof.

Figure 2:
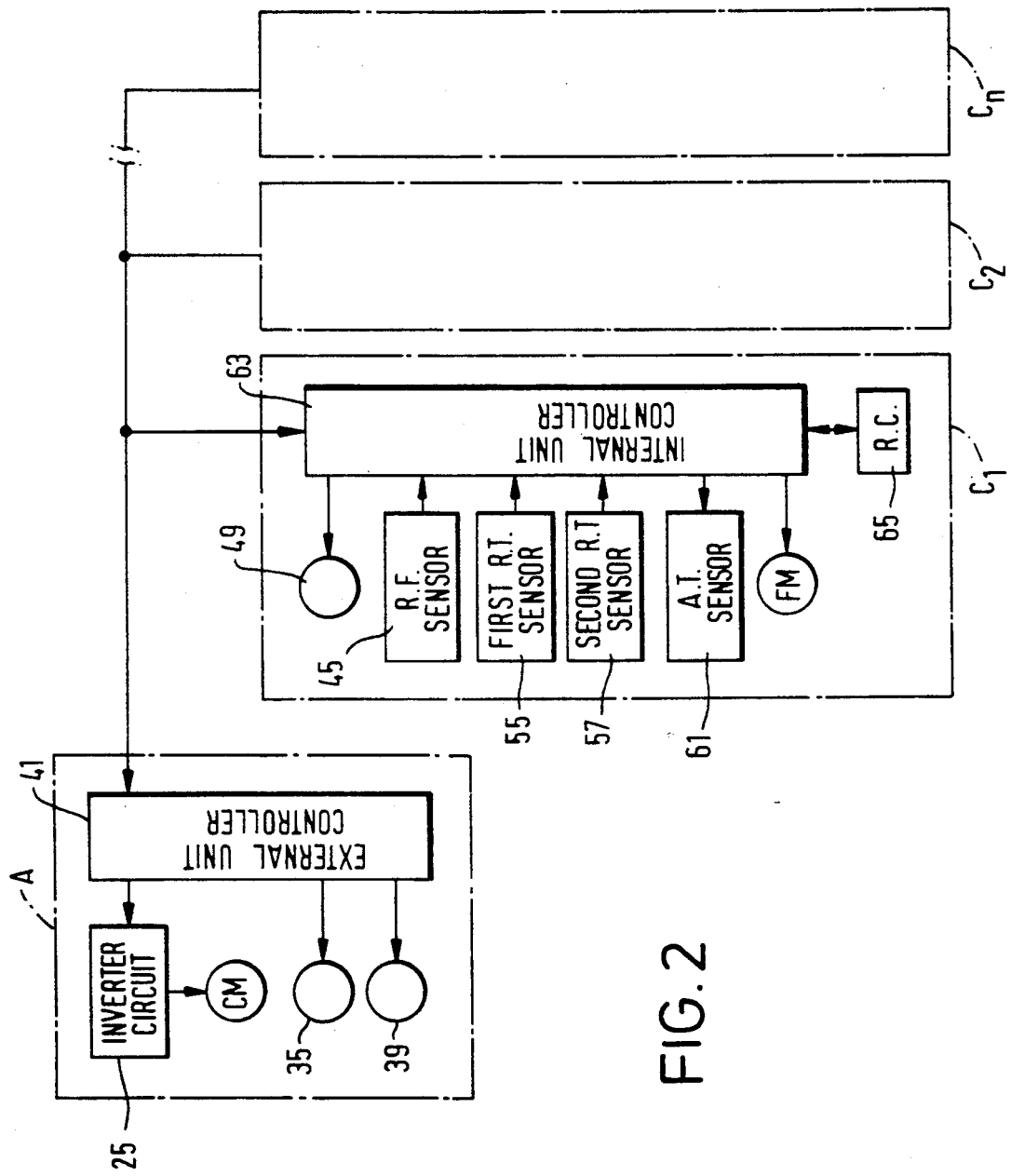
FIG. 2 is a circuit diagram of the air conditioning system shown in FIG. 1.

As shown in FIG. 2, external unit controller 41 composed of a microcomputer and its peripheral circuits is connected to inverter circuit 25 and controls the rotational speed of the driving motor CM of compressor 23 through inverter circuit 25. Four-way valve 35 and the fan motor FM of external fan 39 are respectively connected to controller 41.

Internal unit controller 63 including a microcomputer and its peripheral circuits is connected to refrigerant flow control valve 49, refrigerant flow sensor 45, first and second refrigerant temperature sensors 55 and 57, air temperature sensor 61 and the fan motor FM of internal fan 59, respectively. Internal unit C1 is also provided with a wireless type remote controller 65 the output of which is input to internal unit controller 63. Internal unit controller 63 includes a first control function wherein an operation mode command from remote controller 65, e.g., a cooling operation mode command, a heating operation mode command, or an operation stop command, is transmitted to external unit controller 41, and a second control function in which an air conditioning load, i.e., the difference between the desired room temperature set in remote controller 65 and the actual room temperature detected by air temperature sensor 61, is calculated and sent, as a required capacity, to external unit controller 41. Internal unit controller 63 also includes a third control function wherein the amount of refrigerant flowing into internal unit C1 is determined according to the required capacity, and a fourth control function in which the degree of opening of refrigerant flow control valve 49 is controlled so that the detection result of refrigerant flow sensor 45 is coincident with the determined amount of refrigerant described above.

External unit controller 41 includes a first main control function in which one of the operation mode commands sent from the plurality of internal units C1, C2, ... and Cn is selected in accordance with a predetermined operational priority and the cooling operation is carried out if the selected operation mode command is a cooling operation mode command. In the cooling operation, four-way valve 35 is not activated and compressor 23 is driven. The above-described operational priority may be determined as follows, for example:

1) If cooling and heating operation mode commands are generated from the plurality of internal units C1, C2, ... and Cn, one of the operation mode commands whose total required air conditioning capacity is greater than that of the other operation mode command is selected.

2) If cooling and heating operation mode commands are generated from the plurality of internal units C1, C2, ... and Cn, one of the operation mode commands is selected in accordance with a predetermined priority in terms of rooms to be air-conditioned.

3) If cooling and heating operation mode commands are generated from the plurality of internal units C1, C2, ... and Cn, one of the operation mode commands the number of which is greater than that of the other is selected and the selected operation mode command is extecuted for a prescribed period. After that, the other operational mode command is carried out for the prescribed period. Such operation mode commands are alternately extecuted. The internal unit which generates an operation mode command different from the operation mode command presently executed is stopped during the execution of the selected operation mode command.

The external unit controller 41 includes a second main control function in which the heating operation is carried out if the selected operation mode command is a heating operation mode command. In the heating operation, four-way valve 35 is activated and compressor 23 is driven. External unit controller 41 also includes a third main control function in which the capacity of compressor 23, i.e., the output frequency of inverter circuit 25, is controlled based on the total air conditioning load required by internal unit controller 63 of each internal unit C1, C2, ... or Cn.

The operation of the above-described multiple air conditioning system 21 will now be described with reference to FIGS. 1, 2, and 3. In the cooling operation, refrigerant fed from the output side of compressor 23 flows in the direction indicated by a solid arrow R1 in FIG. 1. Refrigerant flows through four-way valve 35 into external heat exchanger 27 at which refrigerant discharges heat to the external air and is condensed. The condensed refrigerant flows through check value 29, liquid tank 33, refrigerant flow sensor 45 and refrigerant flow control valve 49 into internal heat exchanger 47 at which refrigerant absorbs heat from the internal air and is evaporated. Thus, the room or space where internal unit C1 is located is cooled. The evaporated refrigerant flows into accumulator 37 through four-way value 35 and returns to compressor 23. In the heating operation, four-way valve 35 is activated, and thus refrigerant fed from compressor 23 flows in the direction indicated by a dotted arrow R2 shown in FIG. 1. Refrigerant flows through four-way valve 35 into internal heat exchanger 47 at which refrigerant discharges heat to the internal air and is condensed. Thus, the room or space is heated. The condensed refrigerant flows to external heat exchanger 27 through refrigerant flow control valve 49, refrigerant flow sensor 45, liquid tank 33 and expansion value 31. Refrigerant flowing into external heat exchanger 27 absorbs heat from the external air and is evaporated during the traveling through external heat exchanger 27. The evaporated refrigerant returns into compressor 23 through four-way valve 35 and accumulator 37. The above-described cooling or heating operation is also carried out in other internal units C2, . . . and Cn if the operation start command is inputted to internal units C2, . . . and Cn.

Figure 3:
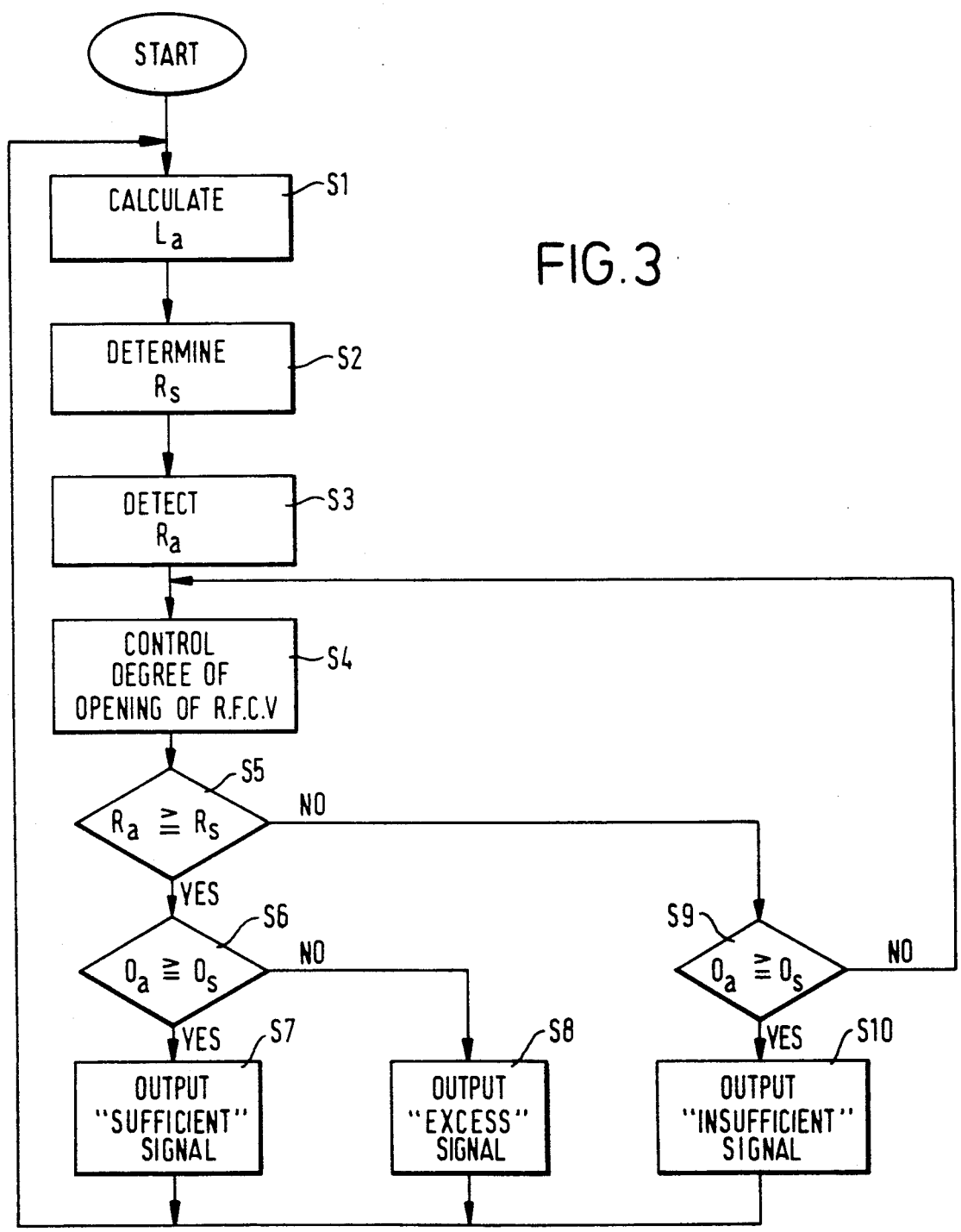
FIG. 3 is a flowchart showing refrigerant flow control of the air conditioning system shown in FIG. 1.

As shown in FIG. 3, when cooling or heating operation start command is input into internal unit controller 63 of internal unit C1 through remote controller 65, internal unit controller 63 calculates the air conditioning load La in the space to be air-conditioned (step S1). The calculated air conditioning load La is fed, as a required capacity, from internal unit controller 63 to external unit controller 41 of external unit A and the amount of refrigerant flowing into internal unit C1 is determined, as a required amount of refrigerant Rs, based on the required capacity described above (step S2). Based on the above-described required capacity fed from internal unit controller 63, external unit controller 41 activates four-way valve 35, if needed, and drives compressor 23 through inverter circuit 25 to feed refrigerant to internal unit C1. In step S3, refrigerant flow sensor 45 of internal unit C1 detects the actual amount of refrigerant Ra flowing into internal unit C1. Based on the detection result of refrigerant flow sensor 45, internal unit controller 63 controls the degree of opening of refrigerant flow control valve 49 in step S4. In step S5, the actual amount of refrigerant Ra detected by refrigerant flow sensor 45 is compared with the required amount of refrigerant Rs determined in step S2. If the actual amount of refrigerant Ra satisfies the required amount of refrigerant Rs, the YES-path is taken in step S5. Otherwise, the NO-path is taken. If the YES-path is taken is step S5, the actual opening degree Oa of refrigerant flow control valve 49 is compared with a target opening degree Os corresponding to the required amount of refrigerant Rs in step S6. In step S6, if the actual opening degree Oa of refrigerant flow control valve 49 is not less than the target opening degree Os, the YES-path is taken. Otherwise, the NO-path is taken in step S6. When the YES-path is taken in step S6, a "sufficient" signal is sent from internal unit controller 63 to external unit controller 41 in step S7 and the above-described step S1 is reexecuted. When the NO-path is taken in step S6, an "excess" signal is sent from internal unit controller 63 to external unit controller 41 in step S8 and the above-described step S1 is reexecuted. When the NO-path is taken in step S5, the actual opening degree Oa of refrigerant flow control valve 49 is compared with the target opening degree Os in step S9. If the actual opening degree Oa is not less than the target opening degree Os in step S9, the YES-path is taken. Otherwise, the NO-path is taken. When the YES-path is taken in step S9, an "insufficient" signal is sent from internal unit controller 63 to external unit controller 41 in step S10 and the above-described step S1 is reexecuted. When the NO-path is taken in step S9, the above-described step S4 is reexecuted.

Figure 4:
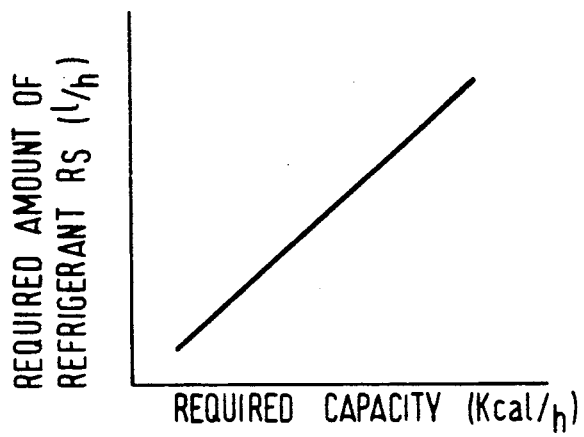
FIG. 4 is a graph showing a relationship between a required capacity and a set amount of refrigerant flow.
Figure 5:
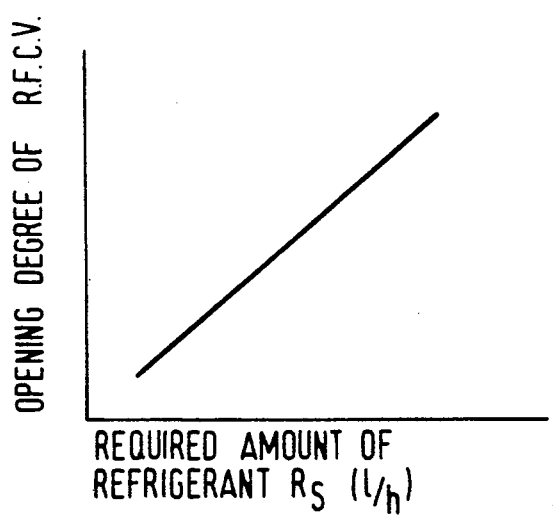
FIG. 5 is a graph showing a relationship between a set amount of refrigerant flow and the opening degree of a refrigerant flow rate control value.

The above-described required amount of refrigerant Rs is proportional to the required capacity, as shown in FIG. 4, and the opening degree of refrigerant flow control valve 49 also is proportional to the required amount of refrigerant Rs, as shown in FIG. 5.

In the above-described operational steps, the operation of internal unit C1 is described. However, the above-described operational steps are executed by other internal units C2, . . . and Cn if the operation start command is generated from the corresponding remote controllers.

External unit controller 41 controls the output frequency of inverter circuit 25 based on the total required capacity from each internal unit controller C1, C2, . . . or Cn which has received the operation start command from the corresponding remote controllers. Thus, compressor 23 is driven by inverter circuit 25 to output a sufficient amount of refrigerant to each internal unit C1, C2, . . . or Cn. However, in the conventional system, it is difficult to supply a sufficient amount of refrigerant to all of the internal units C1, C2, . . . and Cn because of the difference in a fluid resistance of each internal unit C1, C2, . . . or Cn. Insufficient supply of refrigerant may occur in internal units C1, C2, . . . and Cn.

In the above-described embodiment, if the "sufficient" signal, the "excess" signal or the "insufficient" signal is fed from one of the internal unit controllers 63, external unit controller 41 carries out one of the following operations;

(1) The present output frequency of inverter circuit 25 is maintained when external unit controller 41 receives only the "sufficient" signal or both the "sufficient" signal and the "excess" signal.

(2) The output frequency of inverter circuit 25 is decreased by a prescribed value when external unit controller 41 receives only the "excess" signal.

(3) The output frequency of inverter circuit 25 is increased by a prescribed value when external unit controller 41 receives only the "insufficient" signal.

In the cooling operation, the difference between the detection temperatures of first and second refrigerant temperature sensors 55 and 57, i.e., the refrigerant over heating in internal heat exchanger 47, is calculated, and the degree of opening of refrigerant flow control valve 49 is regulated to maintain the refrigerant over heating at a constant value. However, if the refrigerant over heating is excessively varied from a prescribed range, the opening degree control operation of refrigerant flow control valve 49 which regulates the refrigerant over heating is carried out prior to the opening degree control operation of refrigerant flow control valve 49 which obtains the required cooling capacity. Thus, the operational stability of the refrigerating circuit shown in FIG. 1 is ensured. The refrigerant over cooling of internal heat exchanger 47 in the heating operation is controlled similar to that in the cooling operation described above.

With the above-described embodiment, the amount of refrigerant fed to each internal unit C1, C2, . . . or Cn is detected by refrigerant flow sensor 45 provided in each internal unit C1, C2, . . . or Cn, and the degree of opening of refrigerant flow control valve 49 arranged in each internal unit C1, C2, . . . or Cn is controlled so that each detection result of refrigerant flow sensor 45 is coincident with the corresponding required amounts of refrigerant. Thus, an appropriate amount of refrigerant can be distributed to each internal unit C1, C2, . . . Or Cn without receiving any influence by the difference in a fluid resistance in each internal unit C1, C2, . . . or Cn.

In the above-described embodiment, when the detection result Ra of refrigerant flow sensor 45 reaches the required amount of refrigerant Rs (step S5 in FIG. 3), the "sufficient" signal is fed to external unit controller 41 (step S7 in FIG. 3) if the actual opening degree Oa of refrigerant flow control valve 49 reaches the target opening degree Os (step S6 in FIG. 3) or the "excess" signal is fed to external unit controller 41 (step S8 in FIG. 3) if the actual opening degree Oa of refrigerant flow control valve 49 does not reach the target opening degree Os (step S6 in FIG. 3). However, the "sufficient" signal may be sent if the actual opening degree Oa of refrigerant flow control valve 49 is within a prescribed range from the target opening degree Os. The "excess" signal may also be sent if the actual opening degree Oa of refrigerant flow control valve 49 is without the prescribed range. Furthermore, when the detection result Ra of refrigerant flow sensor 45 does not reach the required amount of refrigerant Rs (step S5 in FIG. 3), the "insufficient" signal is set to external unit controller 41 (step S10 in FIG. 3) if the opening degree of refrigerant flow control valve 49 reaches the target opening degree Os (step S9 in FIG. 3). However, the "insufficient" signal may be sent if the actual opening degree Oa of refrigerant flow control valve 49 is within a prescribed range from the target opening degree Os.

Figure 6:
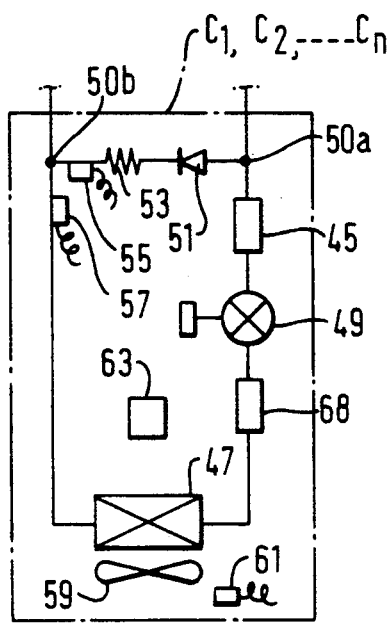
FIG. 6 is a refrigerating circuit diagram illustrating a first modification of the internal unit of the air conditioning system shown in FIG. 1.
Figure 7:
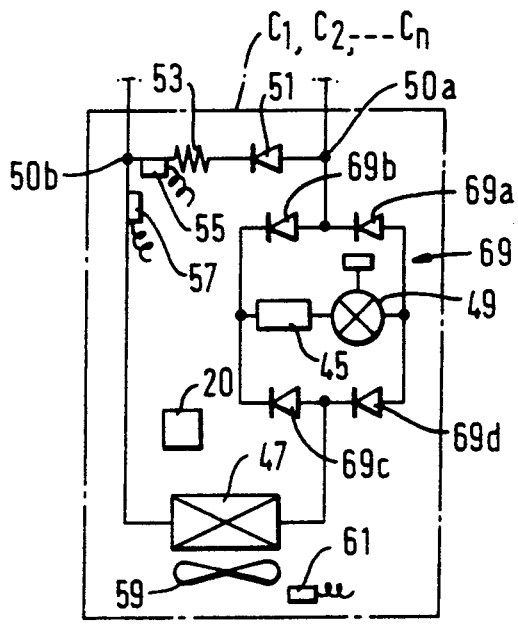
FIG. 7 is a refrigerating circuit diagram illustrating a second modification of the internal unit of the air conditioning system shown in FIG. 1.
Figure 8:
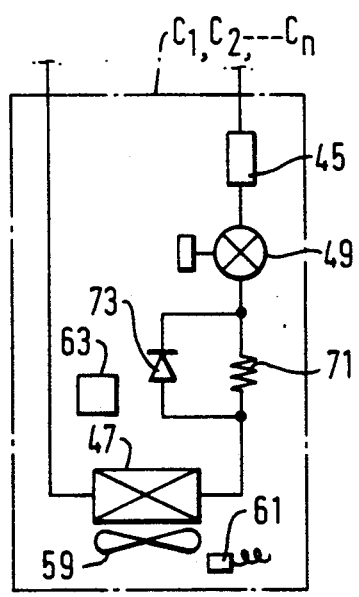
FIG. 8 is a refrigerating circuit diagram illustrating a third modification of the internal unit of the air conditioning system shown in FIG. 1.

An additional refrigerant flow sensor 68 may be arranged between refrigerant flow control valve 49 and internal heat exchanger 47, as shown in FIG. 6. In this case, refrigerant flow sensor 45 is used in the cooling operation and additional refrigerant flow sensor 68 is used in the heating operation to always detect the amount of refrigerant at the upper stream side of refrigerant flow control valve 49 in both operations. The amount of refrigerant flowing through refrigerant flow control valve 49 can be detected with a high accuracy, as compared with the above-described one embodiment. This is because refrigerant at the upper stream side of refrigerant flow control valve 49 is a liquid state whereas refrigerant at the down stream side of refrigerant flow control valve 49 is a gaseous state. It is easy to detect the liquid refrigerant, compared with the gaseous refrigerant. As shown in FIG. 7, a serial circuit of refrigerant flow sensor 45 and refrigerant flow control valve 49 may be connected to a bridge circuit 69 including four check valves 69a, 69b, 69c and 69d so that refrigerant fed from compressor 23 of external unit A always flows refrigerant flow control valve 49 through refrigerant flow sensor 49 in heating and cooling operations. This arrangement can achieve the same result as that of the above-described modification shown in FIG. 6. As shown in FIG. 8, a parallel fluid circuit of a capillary tube 71 and a check valve 73 may be connected between refrigerant flow control valve 49 and internal heat exchanger 47 to eliminate the function of an expansion valve from refrigerant flow control valve 49 in the cooling operation.

Figure 9:
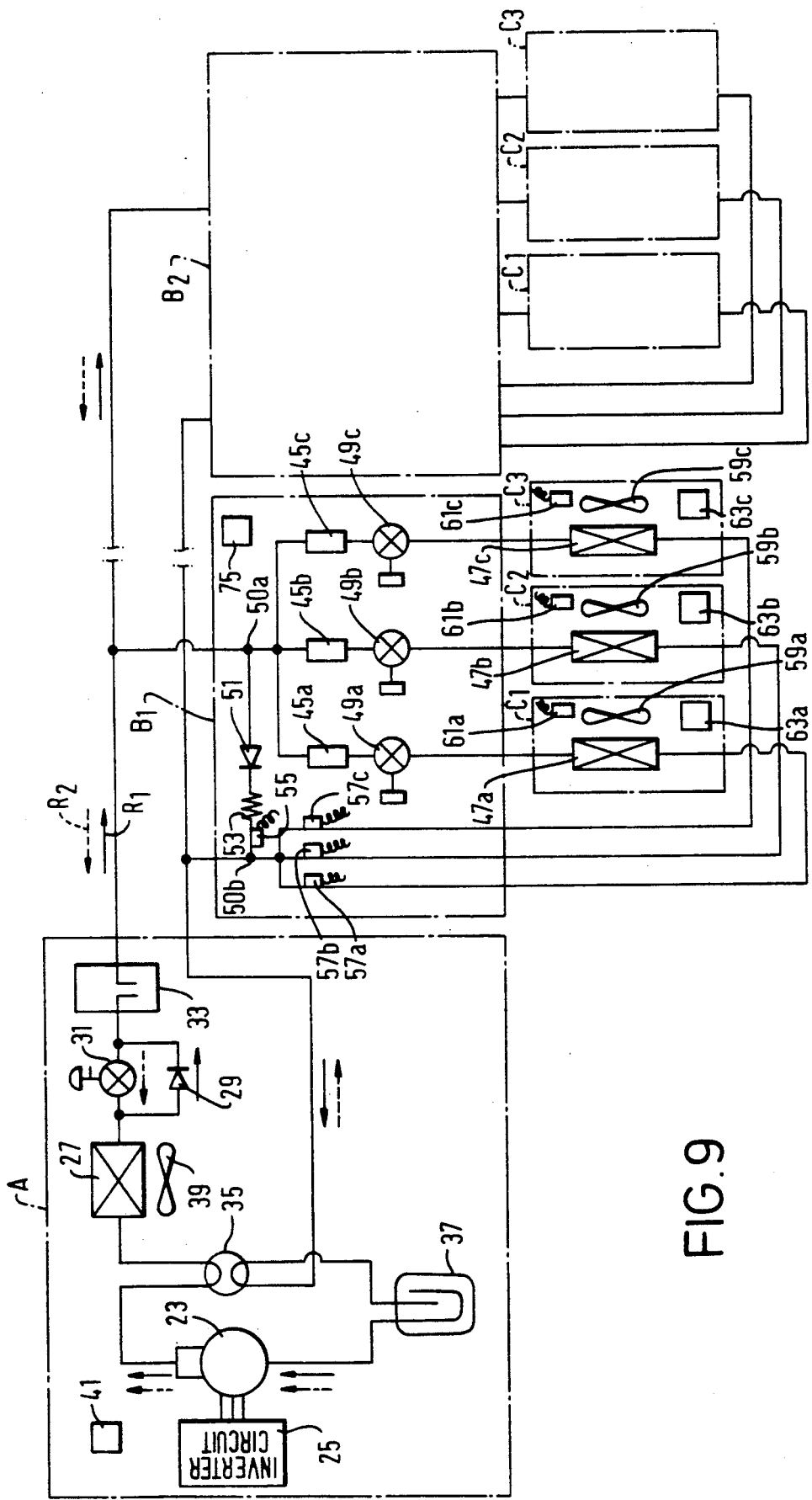
FIG. 9 is a refrigerating circuit diagram illustrating a multiple type air conditioning system of a second embodiment of the present invention.

A second embodiment of the present invention will now be described with reference to FIGS. 9 and 10. However, in the drawings, same numerals are applied to the elements similar to that in the first embodiment, and therefore the detailed descriptions thereof are not repeated. In this embodiment, internal units C1, C2 and C3 are connected to external unit A through a distributing unit B1. Each internal unit C1, C2 or C3 includes internal heat exchanger 47a, 47b or 47c, internal fan 59a, 59b, 59c, air temperature sensor 61a, 61b or 61c, and internal unit controller 63a, 63b or 63c, respectively. Distributing unit B1 includes check valve 51, capillary tube 53, a first refrigerant temperature sensors 55, and a plurality of second refrigerant temperature sensors 57a, 57b and 57c. Distributing unit B1 also includes a plurality of refrigerant flow sensors 45a, 45b and 45c and a plurality of refrigerant flow control valves 49a, 49b and 49c. Distributing unit B1 further includes a distributing unit controller 75.

Figure 10:
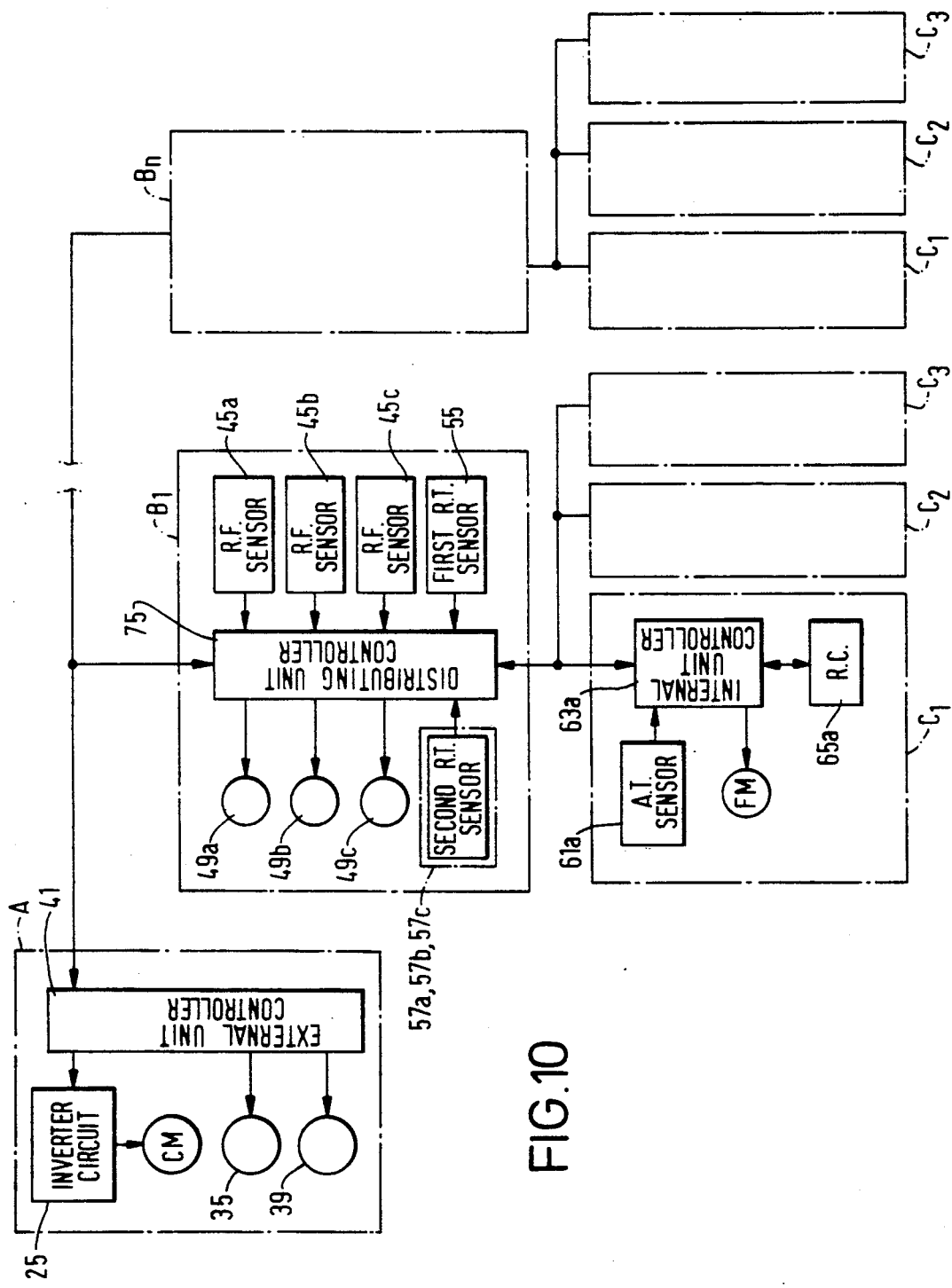
FIG. 10 is a circuit diagram of the air conditioning system shown in FIG. 9.

As shown in FIG. 10, internal unit controller 63a including a microcomputer and its peripheral circuits is connected to air temperature sensor 61a and fan motor FM of internal fan 59a. Internal unit C1 also is provided with wireless type remote controller 65a, the output of which is input to internal unit controller 63a. Internal unit controller 63a includes a first control function wherein an operation mode command fed from remote controller 65a, e.g., a cooling operation command, a heating operation command or an operation stop command, is transmitted to distributing unit controller 75, and a second control function wherein the air conditioning load in the space or room to be air-conditioned is calculated and sent to distributing unit controller 75, as a required capacity.

Distributing unit controller 75 composed of a microcomputer and its peripheral circuits is respectively connected to refrigerant flow control valves 49a, 49b and 49c, refrigerant flow sensors 45a, 45b and 45c. Distributing unit controller 75 is further connected to first refrigerant temperature sensor 55 and second refrigerant temperature sensors 57a, 57b and 57c. Distributing unit controller 75 includes a first sub control function in which one of the operation mode commands sent from the plurality of internal units C1, C2 and C3 is selected in accordance with the prescribed operational priority and the selected operation mode command is sent to external unit controller 41, and a second sub control function wherein a total capacity required from each internal units C1, C2 or C3 is calculated, and the total capacity is sent, as a required total capacity, to external unit controller 41. Distributing unit controller 75 also includes a third sub control function in which the amount of refrigerant flowing into each internal unit C1, C2 or C3 is respectively determined based on the required capacity sent from the corresponding internal unit controllers 63a, 63b and 63c, and a fourth sub control function wherein the degree of opening of each refrigerant flow control valve 49a, 49b or 49c is respectively controlled so that the detection result of each refrigerant flow sensor 45a, 45b or 45c is coincident with the required amount of refrigerant Rs of the corresponding internal units C1, C2 and C3.

External unit controller 41 includes a first main control function wherein if the operation mode command sent from distributing unit controller 75 is a cooling operation, four-way valve 35 is not activated and the cooling operation is carried out, and a second main control function wherein if the operation mode command sent from distributing unit controller 75 is a heating operation, four-way valve 35 is activated and the heating operation is carried out. External unit controller 41 also includes a third main control function in which the output frequency of inverter circuit 25, i.e., capacity of compressor 23, is controlled based on the required total capacity sent from distributing unit controller 75.

The operation of the above-described second embodiment will now be described with reference to FIG. 3. The operation is disclosed, provided that cooling or heating operation start command is generated from remote controllers 63a, 63b and 63c, simultaneously. In step S1, each internal unit controller 63a, 63b or 63c respectively calculates the air conditioning load La in the corresponding spaces to be air-conditioned. Each calculated air conditioning load La is sent, as a required capacity, to distributing unit controller 75 and distributing unit controller 75 calculates a required total capacity of internal units C1, C2 and C3 on the basis of the air conditioning load of each internal unit C1, C2 or C3 to send the required total capacity, as a first distributing required capacity, to external unit controller 41. In step S2, distributing unit controller 75 determines the amount of refrigerant flowing into each internal unit C1, C2 or C3, as a required amount of refrigerant Rs, in accordance with the required capacity of each internal unit C1, C2 or C3. In step S3, refrigerant flow sensor 45a, 45b or 45c of distributing unit B1 detects the actual amount of refrigerant Ra flowing into the corresponding internal units C1, C2 and C3. Based on the detection result of each refrigerant flow sensor 45a, 45b or 45c, distributing unit controller 75 controls the degree of opening of each refrigerant flow control valve 49a, 49b or 49c in step S4. In step S5, if all of the detection results of refrigerant flow sensors 45a, 45b and 45c reach the corresponding required amounts of refrigerant Rs, the YES-path is taken. In step S6, distributing unit controller 75 compares the actual opening degree Oa of each refrigerant flow control valve 49a, 49b or 49c with a target opening degree Os corresponding to the required amount of refrigerant Rs of each internal unit C1, C2 or C3. If the actual opening degree Oa of one of the refrigerant flow control valves 49a 49b and 49c is not less than the corresponding target opening degree Os, the YES-path is taken in step S6. In step S7, distributing unit controller 75 sends a "sufficient" signal to external unit controller 41 and the above-described step S1 is reexecuted. If the NO-path is taken in step S6, an "excess" signal is sent from distributing unit controller 75 to external unit controller 41 in step S8 and the above-described step S1 is reexecuted. In step S5, the NO-path is taken if one of the detection results of refrigerant flow sensors 45a, 45b and 45c, e.g., 45a, does not reach the corresponding required amount of refrigerant Rs. In step S9, distributing unit controller 75 compares the actual opening degree Oa of refrigerant flow control valve 49a (corresponding to refrigerant flow sensor 45a) with the target opening degree Os corresponding to the required amount of refrigerant Rs of internal unit C1. If the actual opening degree Oa of refrigerant flow control valve 49a reaches the corresponding target opening degree Os, the YES-path is taken in step S9. In step S10, an "insufficient" signal is sent from distributing unit controller 75 to external unit controller 41, and the above-described step S1 is reexecuted. If the NO-path is taken in step S9, the above-described step S4 is reexecuted.

The operation of external unit controller 41 when external unit controller 41 receives the "excess" signal or the "insufficient" signal has been described in the one embodiment. Thus, such an operation of external unit controller 41 in the second embodiment should refer to that in the first embodiment, and the description thereof is not repeated.

The above-described second embodiment is suitable for the system wherein the capacity of each internal unit is extremely small and the common space is air-conditioned by a plurality of such internal units.

With the above-described second embodiment, advantages similar to that in the first embodiment can be achieved.

Figure 11:
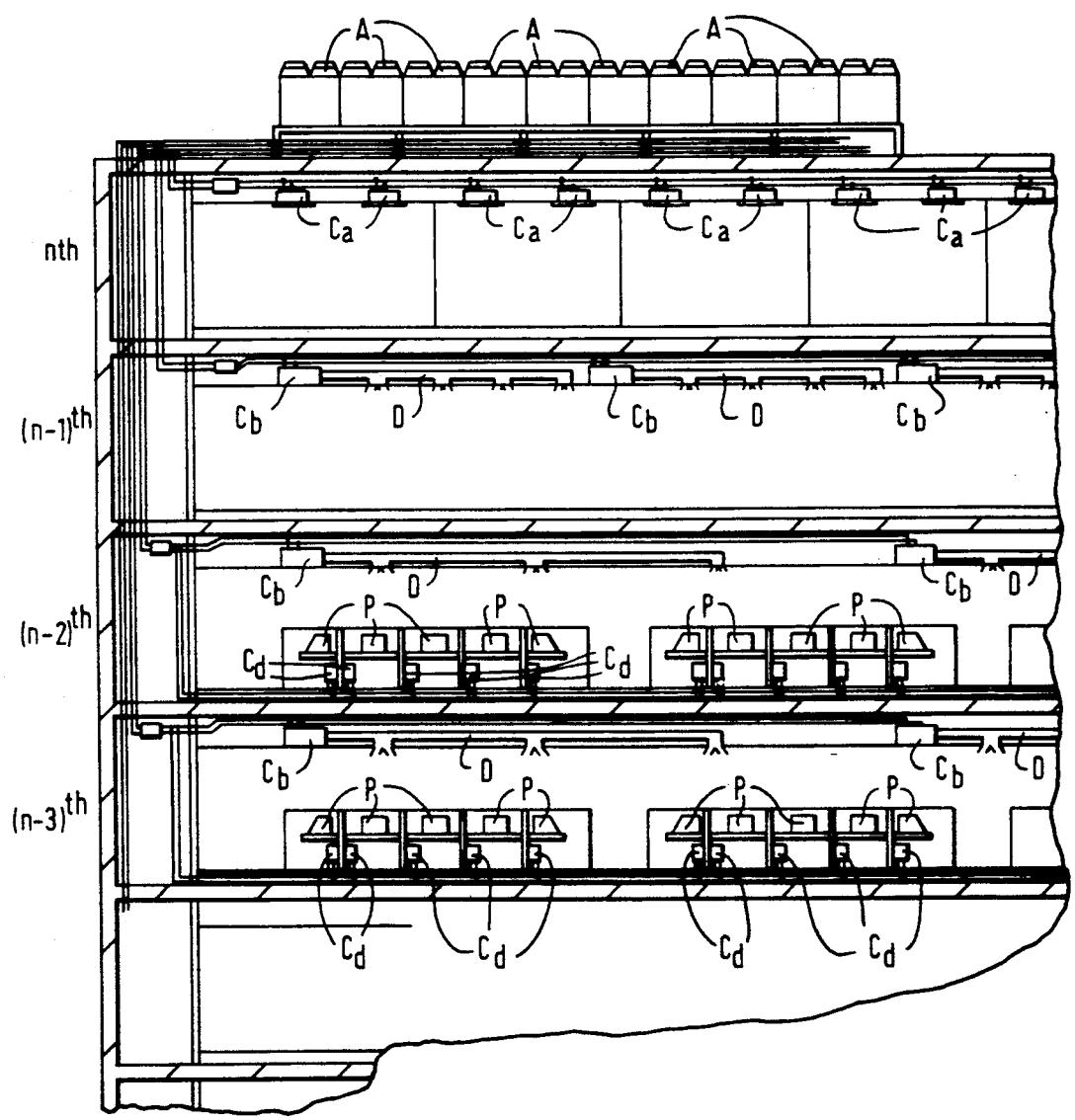
FIG. 11 is a schematic view illustrating one example of an application of the air conditioning systems shown in FIGS. 1 and 9.

An appropriate example in which the above-described first and second embodiments are applied to an air conditioning system in a building is shown in FIG. 11. In FIG. 11, a plurality of external units A are arranged on the rooftop of the building. A plurality of internal units Ca are mounted on the backside of the ceiling in an nth (n=integer) floor of the building. A plurality of internal units Cb each of which includes a duct are mounted on the backside of the ceiling in a (n−1) th floor of the building. In (n-2) th and (n-3) th floors, a system similar to that in the (n-1) th floor is respectively arranged, and a plurality of small capacity internal units Cd also are arranged to respectively supply conditioned air to a space at which a personal computer P is arranged, for example. The above-described first embodiment corresponds to the systems in nth and (n-1) th floors and the second embodiment corresponds to the systems in (n-2) th and (n-3) th floors.

Figure 12:
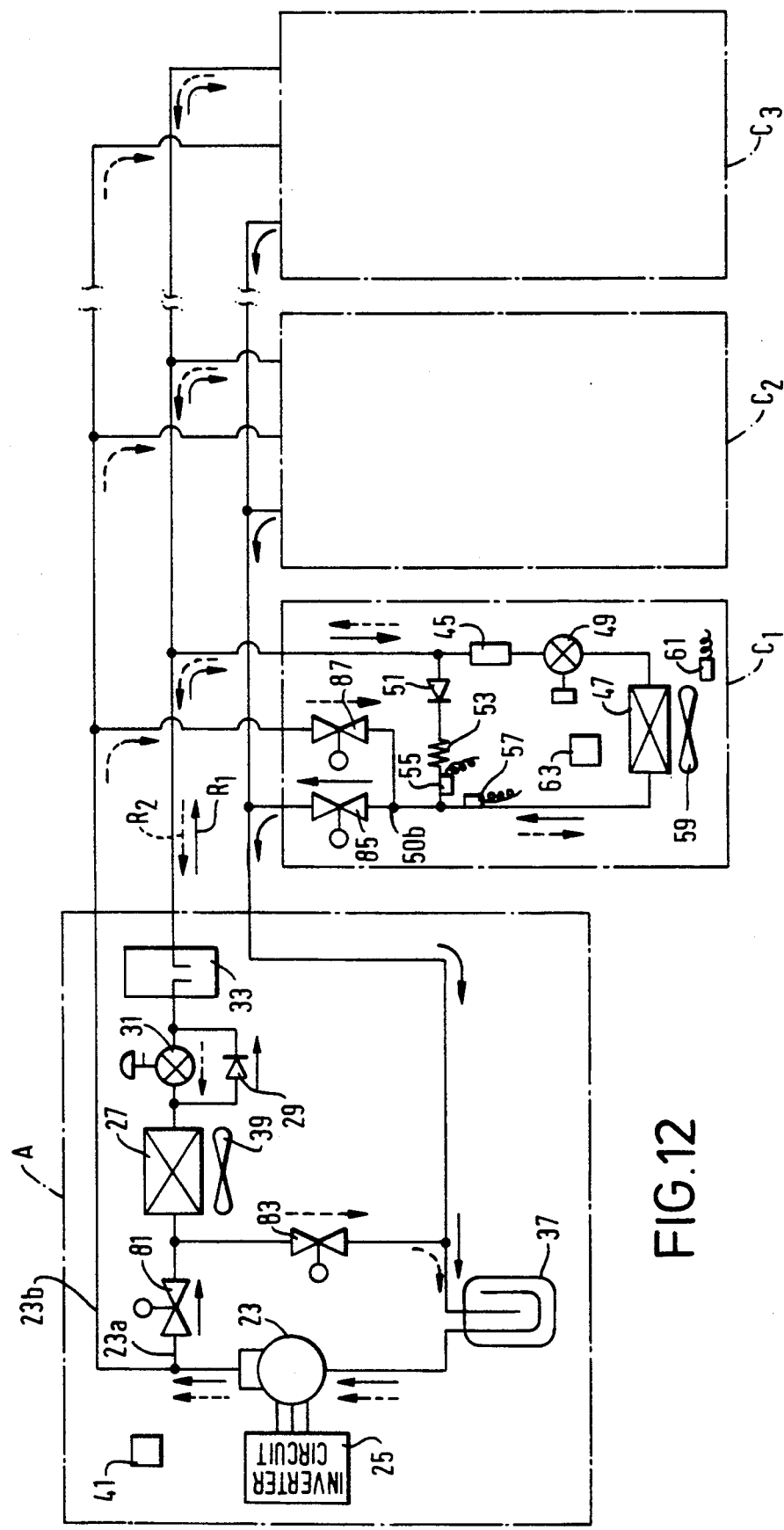
FIG. 12 is a refrigerating circuit diagram illustrating a multiple type air conditioning system of a third embodiment of the present invention.

A third embodiment of the present invention will now be described in more detail with reference to FIGS. 12 and 13. However, in the drawings, same numerals are supplied to the elements similar to that in the first embodiment, and therefore descriptions thereof are not repeated. As shown in FIG. 12, the output of compressor 23 is divided into a first path 23a and a second path 23b. First path 23a is connected to external heat exchanger 27 through a bidirectional valve 81. A bidirectional valve 83 is connected between the connecting point of valve 81 and external heat exchanger 27 and the input side of accumulator 37, instead of four-way valve 35. A bidirectional valve 85 is connected between accumulator and the connecting point 50b of first and second refrigerant temperature sensors 55 and 57. Second path 23b from compressor 23 is connected to the connecting point 50b through a bidirectional valve 87.

Figure 13:
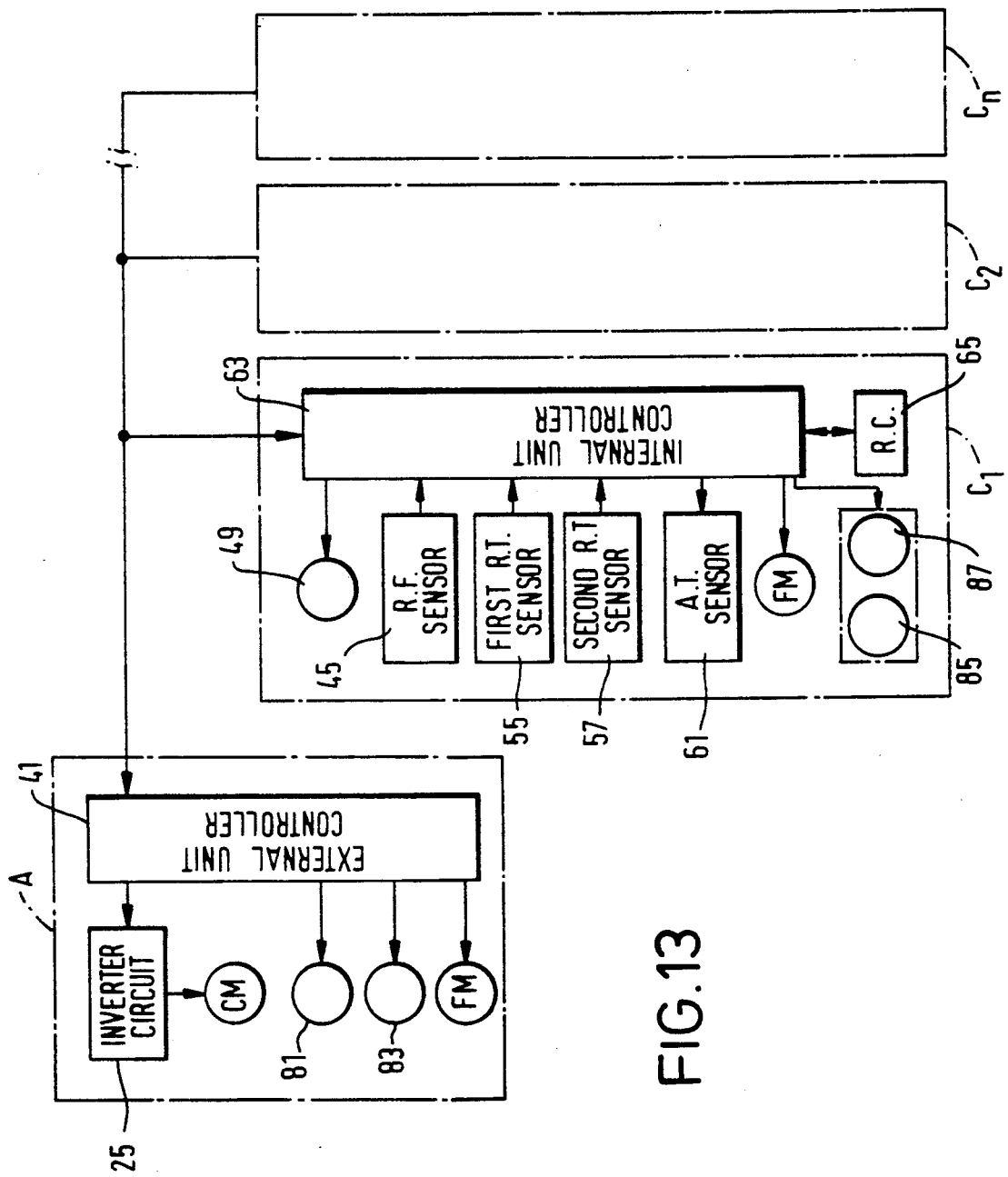
FIG. 13 is a circuit diagram of the air conditioning system shown in FIG. 12.

As can be seen in FIG. 13, bidirectional valves 81 and 83 are respectively connected to external unit controller 41. In internal unit C1, bidirectional valves 85 and 87 are respectively connected to internal unit controller 63.

Internal unit controller 63 includes first, second, third and fourth control functions similar to those of the internal unit controller of the first embodiment. Internal unit controller 63 also includes a fifth control function in which bidirectional valves 85 and 87 are controlled based on the operation mode command sent to external unit controller 41.

External unit controller 41 includes a first operation mode set function wherein a cooling main operation mode is set if a total cooling capacity required by each internal unit C1, C2, ... or Cn which outputs the cooling operation mode command is greater than a total heating capacity required by each internal unit C1, C2, ... or Cn which outputs the heating operation mode command, and a first compressor control function in which the output frequency of inverter circuit 25, i.e., capacity of compressor 23, is controlled in response to the total cooling capacity when the cooling main operation mode is set. External unit controller 41 further includes a second operation mode set function wherein a heating main operation is set if a total heating capacity required by each internal unit C1, C2, ... or Cn which outputs the heating operation mode command is greater than a total cooling capacity requested by each internal unit C1, C2, ... or Cn which outputs the cooling operation mode command, and a second compressor control function in which the output frequency of inverter circuit 25 is controlled based on the total heating capacity when the heating main operation mode is set. External unit controller 41 still further includes a valve control function in which bidirectional valve 81 and 83 are controlled responding to heating or cooling operation mode command.

Following four refrigerating circuit functions are carried out by internal and external unit controllers 63 and 41;

1. A first function wherein refrigerant output from compressor 23 flows to external heat exchanger 27 and returns to compressor 23 through internal heat exchanger 47 of each internal unit C1, C2 ... or Cn which outputs the cooling operation mode command when the cooling main operation mode is set.

2. A second function in which a part of refrigerant output from compressor 23 flows to internal heat exchanger 47 of each internal unit C1, C2 ... or Cn which outputs the heating operation mode command and then joins the remaining refrigerant flowing into internal heat exchanger 47 of each internal unit C1, C2, .... or Cn which outputs the cooling operation mode command when the cooling main operation mode is set.

3. A third function wherein refrigerant fed from compressor 23 flows to internal heat exchanger 47 of each internal unit C1, C2 ... or Cn which outputs the heating operation mode command and returns to compressor 23 through external heat exchanger 27 when the heating main operation mode is set.

4. A fourth function in which a part of refrigerant flowing through internal heat exchanger 47 of each internal unit C1, C2, ... or Cn which outputs the heating operation mode command and returns to compressor 23 through internal heat exchange 47 of each internal unit which outputs the cooling operation mode command when the heating main operation mode is set.

The operation of the above-described embodiment will now be described. When the cooling main operation is carried out in the refrigerating circuit shown in FIG. 12, external unit controller 41 controls the capacity of compressor 23 based on the total cooling capacity requested by each internal unit C1, C2 ... or Cn which outputs the cooling operation mode command. External unit controller 41 opens bidirectional valve 81 and closes bidirectional valve 83. Thus, refrigerant flows through the refrigerating circuit in the direction indicated by a solid arrow R1 in FIG. 12, and external heat exchanger 27 acts as a condensor.

when the heating main operation is carried out, external unit controller 41 controls the capacity of compressor 27 in accordance with the total heating capacity requested by each internal unit C1, C2, ... or Cn which outputs the heating operation mode command. External unit controller 41 closes bidirectional valve 81 and opens bidirectional valve 83. Thus, refrigerant flows in the direction indicated by a dotted arrow R2 shown in FIG. 12, and external heat exchanger 27 acts as an evaporator.

In the above-described cooling or heating main operation, each internal unit controller 63 which outputs the cooling operation mode command opens bidirectional valve 85 and closes bidirectional valve 87. Refrigerant flows in the direction indicated in the solid arrow R1, and therefore internal heat exchanger 47 thereof acts as an evaporator. At the same time, each internal unit controller 63 which outputs the heating operation mode command closes bidirectional valve 85 and opens bidirectional valve 87. Refrigerant flows in the direction indicated in the dotted arrow R2, and therefore internal heat exchanger 47 thereof acts as a condenser.

In this case, each internal unit controller 63 sets a required amount of refrigerant flowing into the corresponding internal units 63 based on the required cooling or heating capacity thereof. Furthermore, each internal unit controller C1, C2, ... or Cn detects the actual amount of refrigerant flowing into the corresponding internal units 63 by refrigerant flow sensor 11 thereof and controls the degree of opening of the corresponding refrigerant flow control valve 49 so that the detection result thereof is coincident with the required amount of refrigerant.

In the above-described embodiment, each internal unit controller 63 controls the degree of opening of the corresponding refrigerant flow control valves 49 so that the actual amount of refrigerant detected by the corresponding refrigerant sensors 45 is coincident with the required amount of refrigerant determined based on the corresponding required heating or cooling capacities. Thus, an appropriate amount of refrigerant can be distributed to each internal unit C1, C2, ... or Cn even though the flow resistance in each internal unit C1, C2, ... or Cn is different from one another.

Figure 14:
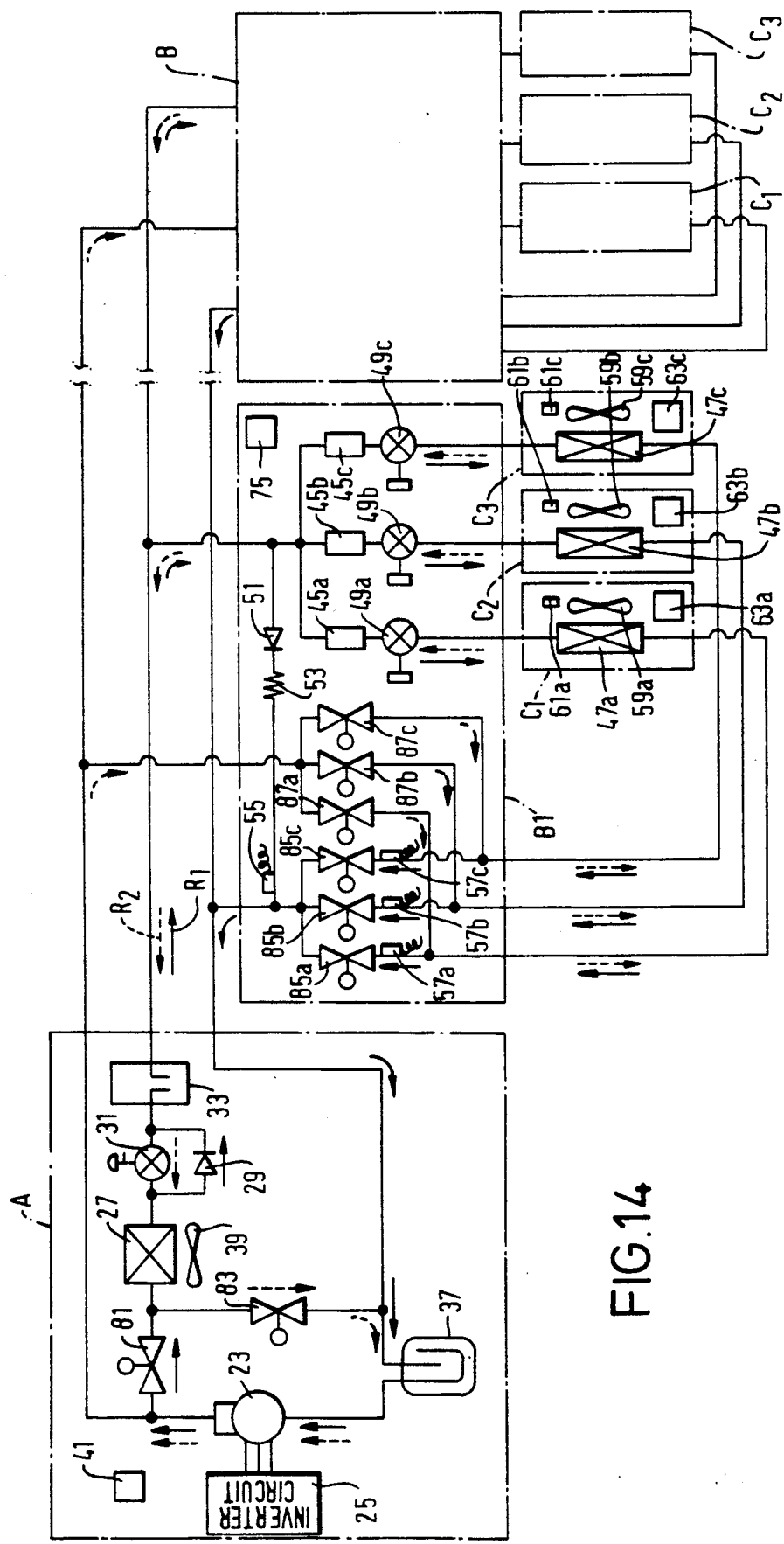
FIG. 14 is a refrigerating circuit diagram illustrating a multiple type air conditioning system of a fourth embodiment of the present invention.
Figure 15:
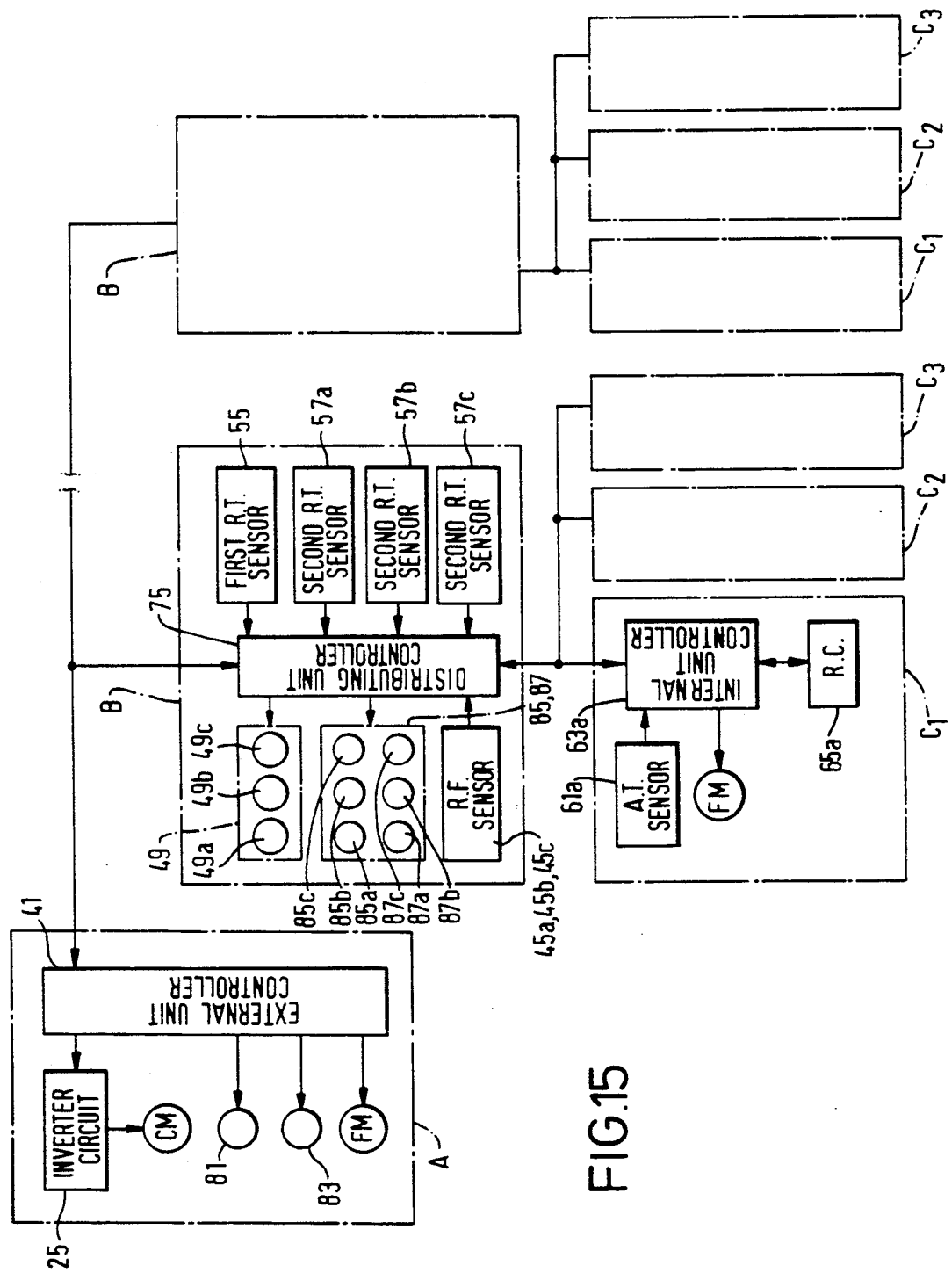
FIG. 15 is a circuit diagram of the air conditioning system shown in FIG. 14.

A fourth embodiment of the present invention will now be described with reference to FIGS. 14 and 15. However, in the drawings, same numerals are applied to the elements similar to that in the second and third embodiments (FIGS. 9, 10, 12 and 13), and therefore the detailed descriptions thereof are not repeated. In this embodiment, internal units C1, C2 and C3 are connected to external unit A through a distributing unit B1. Distributing unit B1 includes a plurality of bidirectional valves 85a, 85b and 85c the number of which corresponds to the number of internal units C1, C2 and C3 connected to distributing unit B1. One of the ends of each bidirectional valves 85a, 85b or 85c is commonly connected to accumulator 37 and the other end thereof is respectively connected to the corresponding internal heat exchangers 47a, 47b and 47c. Distributing unit B1 also includes a plurality of bidirectional valves 87a, 87b and 87c the number of which is the same as that of bidirectional valves 85a, 85b and 85c. One of the ends of each bidirectional valve 87a, 87b or 87c is commonly connected to the output side of compressor 23 and the other end thereof is respectively connected to the corresponding internal heat exchangers 47a, 47b and 47c. As shown in FIG. 15, distributing unit B1 includes distributing unit controller 75 which controls the operation of each bidirectional valve 85a, 85b, 85c, 87a, 87b or 87c.

Internal unit controller 63a includes a first control function wherein an operation mode command fed from remode controller 65a, e.g., a cooling operation command, a heating operation command or an operation stop command, is transmitted to distributing unit controller 75, and a second control function in which the air conditioning load in the space or room to be air-conditioned, i.e., a difference between a desired room temperature and an actual room temperature detected by air temperature sensor 61a, is calculated and sent to distributing unit controller 75, as a required capacity.

Following nine refrigerating circuit functions are executed by internal and distributing unit controlleres 63a, 63b and 63c and 75:

1. A first function in which the open or close operation of each bidirectional valve 85a, 85b, 85c, 87a, 87b, or 87c is controlled based on the operation mode command from each internal unit C1, C2 or C3.

2. A second function in which the cooling main operation mode is set if the required total cooling capacity of each internal unit C1, C2 or C3 which outputs the cooling operation mode command is greater than the required total heating capacity of each internal unit C1, C2 or C3 which outputs the heating operation mode command.

3. A third function wherein the output frequency of inverter circuit 25, i.e., the capacity of compressor 23, is controlled according to the required total cooling capacity when the cooling main operation is carried out.

4. A fourth function in which refrigerant fed from compressor 23 flows to external heat exchanger 27 and returns to compressor 23 through the internal heat exchanger of each internal unit C1, C2 or C3 which outputs the cooling operation mode command.

5. A fifth function in which a part of refrigerant output from compressor 23 flows to the internal heat exchanger of each internal unit C1, C2 or C3 which outputs the heating operation mode command and then joins the remaining refrigerant flowing into the internal heat exchanger of each internal unit C1, C2 or C3 which outputs the cooling operation mode command.

6. A sixth function in which the heating main operation is set if the required total heating capacity of each internal unit C1, C2 or C3 which outputs the heating operation mode command is greater than the required total cooling capacity of each internal unit C1, C2 or C3 which outputs the cooling operation mode command.

7. A seventh function in which the output frequency of inverter circuit 25 is controlled based on the required total heating capacity when the heating main operation is carried out.

8. An eighth function in which refrigerant fed from compressor 27 flows to the internal heat exchanger of each internal unit C1, C2 or C3 which outputs the heating operation mode command and returns to compressor 27 through external heat exchanger 27.

9. A ninth function in which a part of refrigerant flowing from the internal heat exchanger of each internal unit which outputs the heating operation mode command flows into the internal heat exchanger of each internal unit C1, C2 or C3 which outputs the cooling operation mode command and then returns to compressor 27.

The operation of the above-described embodiment will be described. When the cooling main operation is carried out in the refrigerating circuit shown in FIG. 14, external unit controller 41 controls the capacity of compressor 23 based on the sum total of the required cooling capacity fed from each internal unit C1, C2 or C3 which outputs the cooling operation mode command. External unit controller 41 opens bidirectional valve 81 and closes bidirectional valve 83. Refrigerant flows in the direction indicated by the solid arrow R1 in FIG. 14, and thus external heat exchanger 27 acts as a condenser. When the heating main operation is carried out, external unit controller 41 controls the capacity of compressor 23 in accordance with the sum total of the required heating capacity of each internal unit C1, C2 or C3 which outputs the heating operation mode command. External unit controller 41 closes bidirectional valve 81 and opens bidirectional valve 83. Refrigerant flows in the direction indicated in a dotted arrow R2 in FIG. 14 and thus external heat exchanger 27 acts as an evaporator.

Distributing unit controller B1 opens each bidirectional valve 85a, 85b or 85c corresponding to each internal unit C1, C2 or C3 which outputs the cooling operation mode command and closes each bidirectional valve 87a, 87b or 87c corresponding to internal unit C1, C2 or C3 which outputs the cooling operation mode command. Thus, refrigerant flows in the direction indicated in the solid arrow R1 in FIG. 14 and the internal heat exchanger of each internal unit C1, C2 or C3 which outputs the cooling operation mode command acts as an evaporator. At the same time, distributing unit controller B1 closes each bidirectional valve 85a, 85b or 85c corresponding to each internal unit C1, C2 or C3 which outputs the heating operation mode command and opens each bidirectional valve 87a, 87b or 87c corresponding to each internal unit C1, C2 or C3 which outputs the heating operation mode command. Thus, refrigerant flows in the direction indicated in a dotted arrow R2 in FIG. 14 and the internal heat exchanger of each internal unit C1, C2 or C3 which outputs the heating operation mode command acts as a condenser.

In this case, distributing unit controller 75 respectively set a required amount of refrigerant flowing into each internal unit C1, C2 or C3 in response to the corresponding required heating or cooling capacities. Furthermore, distributing unit controller 75 respectively detects the actual amount of refrigerant flowing into each internal unit C1, C2 or C3 and controls the degree of opening of each refrigerant flow control valve 49a, 49b or 49c so that each actual amount of refrigerant is coincident with the corresponding required amounts of refrigerant.

With the above-described embodiment, an appropriate amount of refrigerant can be distributed to each internal unit C1, C2 or C3 through distributing unit B1 even though the flow resistance of each internal unit C1, C2 or C3 is different from one another.

In summary, it will be seen that the present invention overcomes the disadvantages of the prior art and provides an improved construction for a multiple type air conditioning system which can distribute an appropriate amount of refrigerant to each internal unit thereof. Many changes and modifications in the above-described embodiments can thus be carried out without departing from the scope of the present invention. Therefore, the appended claims should be construed to include all such modifications.

What is claimed is:

1. A multiple air conditioning system comprising:
   a plurality of air conditioning units for respectively supplying conditioned air to spaces, each air conditioning unit having a required air conditioning capacity when operating;
   a variable refrigerant supply unit for supplying refrigerant to the plurality of air conditioning units on the basis of the sum total of the required air conditioning capacity of each air conditioning unit;
   means for respectively determining a target amount of refrigerant flowing into each air conditioning unit based on the corresponding required air conditioning capacities;
   refrigerant flow control means for respectively detecting an actual amount of refrigerant flowing through each air conditioning unit;
   refrigerant flow control means for respectively controlling the amount of refrigerant flowing through each air conditioning unit; and
   means responsive to the refrigerant flow sensor means for regulating the refrigerating flow control means so that the respective actual amounts of refrigerant detected by the refrigerant flow sensor means reach the corresponding target amounts of refrigerant.

2. A system according to claim 1, wherein the refrigerant flow control means has an upstream side and a downstream side in terms of the flow of refrigerant, and the refrigerant flow sensor means includes two flow sensors one of which is arranged at the upstream side and the other is disposed at the down stream side of the refrigerant flow control means.

3. A system according to claim 1 further including a bridge circuit having four check valves through which refrigerant from the refrigerant supply unit flows, the refrigerant flow sensor means and the refrigerant flow control means being connected to the brigde circuit so that refrigerant flows to the refrigerant flow control means through the refrigerant flow sensor means via the brigde circuit.

4. A system according to claim 1 further including a distributing unit means connected between the refrigerant supply unit and the plurality of air conditioning units for distributing refrigerant from the refrigerant supply unit to each air conditioning unit.

5. A system according to claim 1, wherein each air conditioning unit includes means for detecting an actual temperature in the space, means for setting a desired temperature and means for calculating the difference between the actual temperature and the desired temperature as the required air conditioning capacity.

6. A system according to claim 5, wherein the variable refrigerant supply unit includes a variable capacity compressor and an inverter which controls the capacity of the compressor in accordance with the sum total of the required air conditioning capacity of each air conditioning unit.

7. A system according to claim 6, wherein the variable refrigerant supply unit includes an external heat exchanger through which refrigerant flows.

8. A system according to claim 7, wherein each air conditioning unit includes an internal heat exchanger through which refrigerant flows.

9. A system according to claim 8, wherein the system includes means for dividing refrigerant from the variable capacity compressor into a first refrigerant and a second refrigerant, and each air conditioning unit includes first valve means for allowing the first refrigerant to flow into the internal heat exchanger without passing through the external heat exchanger while the air conditioning unit outputs a heating operation mode command, and second valve means for allowing the second refrigerant to flow into the internal heat exchanger through the external heat exchanger while the air conditioning unit outputs a cooling operation mode command.

10. A multiple air conditioning system comprising:
a plurality of air conditioning units for respectively supplying conditioned air to spaces, each air conditioning unit having a required air conditioning capacity when operating;
a variable refrigerant supply unit for supplying refrigerant to the plurality of air conditioning units, the refrigerant supply unit including a variable capacity compressor and an inverter which controls the capacity of the compressor by changing an output frequency thereof on the basis of the sum total of the required air conditioning capacity of each air conditioning unit;
refrigerant flow sensor means for respectively detecting an actual amount (Ra) of refrigerant flowing through each air conditioning unit;
refrigerant flow control means for respectively controlling the amount of refrigerant flowing through each air conditioning unit, the refrigerant flow control means including a plurality of variable opening valves corresponding to the plurality of air conditioning units, each variable opening valve having an actual opening degree (Oa) when operating;
means for setting a desired temperature in the space;
means for detecting an actual temperature in the space;
a plurality of air conditioning unit controllers corresponding to the plurality of air conditioning units for respectively controlling the operation of the plurality of air conditioning units, each air conditioning unit controller including,
means for calculating the difference between the actual temperature and the desired temperature as a required air conditioning capacity,
means for determining a target amount (Rs) of refrigerant flowing into the air conditioning unit based on the required air conditioning capacity,
means for determining a target opening degree (Os) of the variable opening valve on the basis of the required air conditioning capacity,
means for comparing the actual amount (Ra) of refrigerant with the target amount (Rs),
means for comparing the actual opening degree (Oa) of the variable opening valve with the target opening degree (Os),
means for outputting a "sufficient" signal when the actual amount (Ra) of refrigerant is not less than the target amount (Rs) and the actual opening degree (Oa) of the variable opening valve is not less than the target opening degree (Os),
means for outputting an "excess" signal when the actual amount (Ra) of refrigerant is not less than the target amount (Rs) and the target opening degree (Os) of the variable opening valve is greater than the actual opening degree (Oa), and
means for outputting an "insufficient" signal when the target amount (Rs) of refrigerant is greater than the actual amount (Ra) and the actual opening degree (Oa) of the variable opening valve is not less than the target opening degree (Os); and
refrigerant supply unit controller for controlling the operation of the refrigerant supply unit, the refrigerant supply unit controller including,
means for maaintaining the present output frequency of the inverter when only the "sufficient" signal or both the "sufficient" and "excess" signals are output from the plurality of the air conditioning unit controllers,
means for decreasing the output frequency of the inverter when only the "excess" signal is output from the plurality of the air conditioning unit controllers, and
means for increasing the output frequency of the inverter when only the "insufficient" signal is output from the plurality of air conditioning unit controllers.

* * * * *